Figures 1, 2:
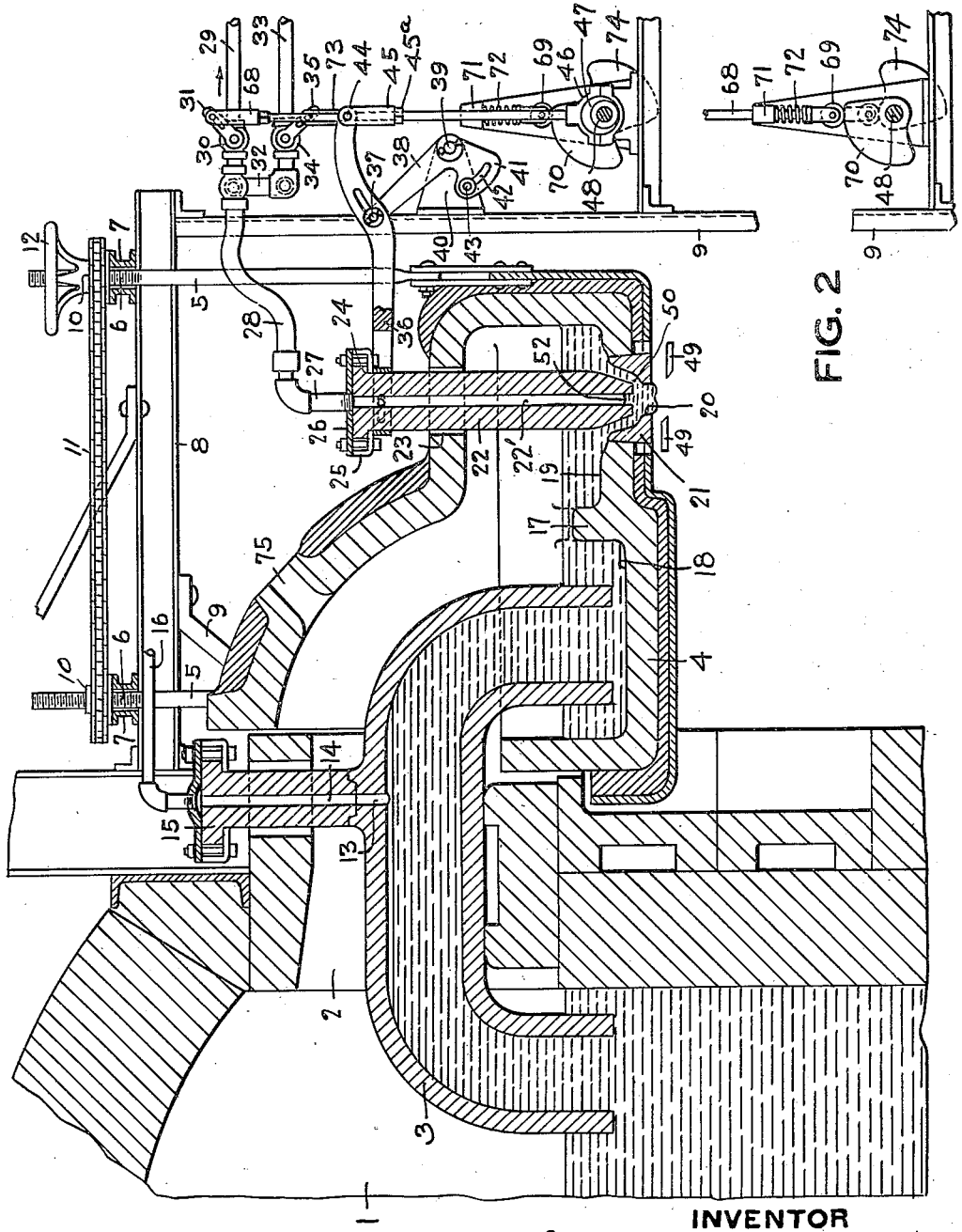

March 17, 1931. G. E. HOWARD 1,796,929
APPARATUS FOR AND METHOD OF FEEDING MOLTEN GLASS
Original Filed July 16, 1917  3 Sheets-Sheet 1

INVENTOR
George E. Howard
By Ray, Totten & Brown
attorneys

March 17, 1931.   G. E. HOWARD   1,796,929
APPARATUS FOR AND METHOD OF FEEDING MOLTEN GLASS
Original Filed July 16, 1917   3 Sheets-Sheet 2
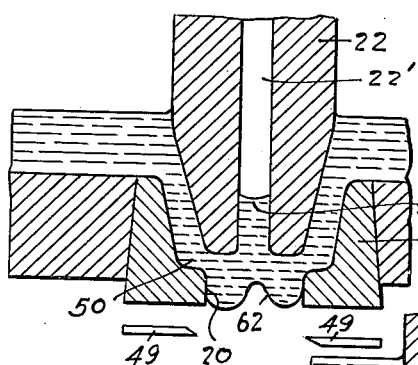
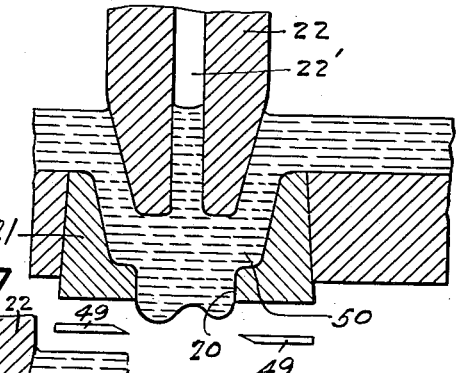
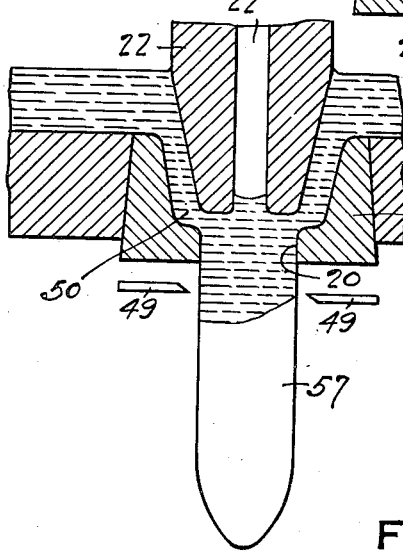
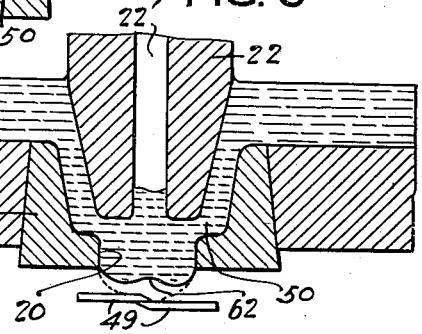
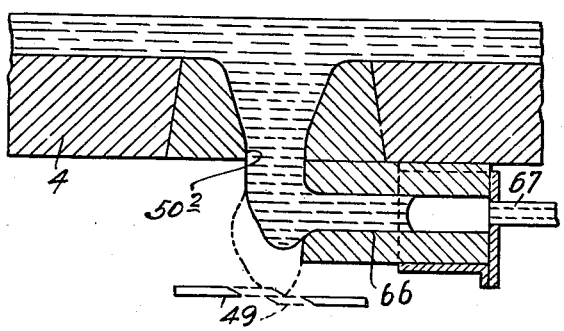
INVENTOR
George E. Howard
By Kay, Totten Brown
Attorneys March 17, 1931. G. E. HOWARD 1,796,929
APPARATUS FOR AND METHOD OF FEEDING MOLTEN GLASS
Original Filed July 16, 1917 3 Sheets-Sheet 3
FIG. 9 FIG. 10 FIG. 11
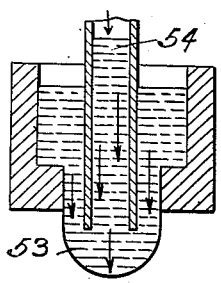
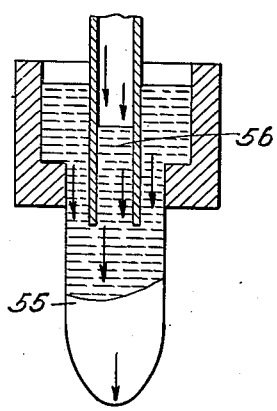
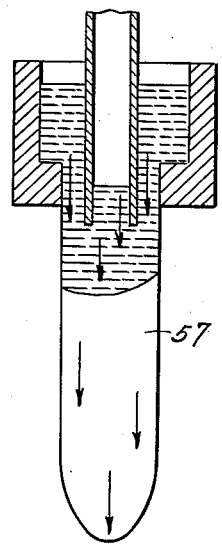
FIG. 12 FIG. 13
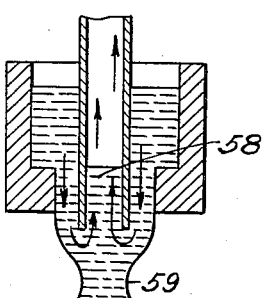
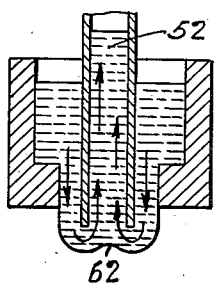
FIG. 14
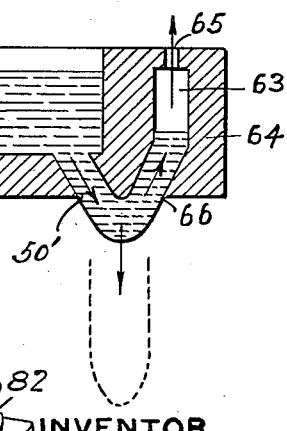
FIG. 15
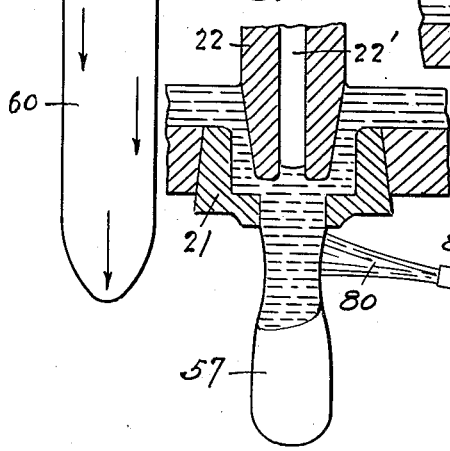
INVENTOR
George E. Howard
By Kay, Totten & Brown,
Attorneys Patented Mar. 17, 1931

1,796,929

UNITED STATES PATENT OFFICE

GEORGE E. HOWARD, OF BUTLER, PENNSYLVANIA, ASSIGNOR, BY MESNE ASSIGNMENTS, TO HARTFORD-EMPIRE COMPANY, OF HARTFORD, CONNECTICUT, A CORPORATION OF DELAWARE

APPARATUS FOR AND METHOD OF FEEDING MOLTEN GLASS

Original application filed July 16, 1917, Serial No. 180,795. Divided and this application filed June 9, 1923. Serial No. 644,392.

My invention relates to apparatus for and methods of delivering glass in molten form from a tank furnace or other receptacle, and discharging the glass in proper amounts as to weight and in proper shape and condition for fabricating into bottles, sheets and for other purposes.

In a general way, apparatus of the invention comprises two main parts:—First, a delivery apparatus for taking the molten glass from a tank furnace or other supply body and transferring it into a receptacle; and second, a receptacle which is so constructed and arranged as to deliver quantities of glass in exact size and of proper weight, shape and condition for final working.

In function and structure, the apparatus for delivering the molten glass from the tank to the receptacle is made similar and closely related to the structure shown in my Patent No. 1,138,111 of May 4, 1915, and is also related to my Patent No. 1,138,110. The latter or charge delivering structure is also similar to and covers practically the same function as described in my Patent No. 1,315,668 of Sept. 9, 1919.

The objects of my invention are:

1st. To provide a practical means for delivering molten glass in proper condition to be formed into bottles and other objects.

2nd. A more specific object is to do this work in such a way that the apparatus can be used in conjunction with the standard semi-automatic bottle machines and presses which are in general use.

In order to accomplish these objects, especially the second, it is necessary to so construct and arrange my apparatus that it will duplicate the work of the hand gatherer by mechanical means, so that it will not be necessary for the manufacturer or user to remodel his present machines, or change his methods, which have been developed to meet the various limitations of speed, etc., which manual work entails.

With these and other objects in view, the invention consists in the construction and arrangement of parts, and in the method of using the same, which is illustrated in the accompanying drawings, in which Fig. 1 is a vertical section, parts being in elevation, of an apparatus embodying my invention; Fig. 2 is a detail of certain cam members of the device; Figs. 3 to 7, inclusive, are views in section illustrating various stages or steps in the operation of the device; Fig. 8 is a view of a modification of the parts shown in Figs. 3 to 7; Figs. 9 to 13, inclusive, are views in section illustrating another modification of the apparatus; and Figs. 14 and 15 are views in section showing still further modifications.

In the embodiment of my invention herein selected for illustration, and referring first to Figs. 1 to 6, inclusive, 1 indicates the delivery end of the refining-chamber of a glass tank furnace. This may be of more or less ordinary construction, and is provided with an opening 2. Located in the outlet is a siphon member 3, which spans the wall of the refining-chamber and delivers the glass to a pot or receptacle 4. The pot 4 may be adjustable up and down, and for this purpose has attached to it three supporting-rods 5 (only two of which are shown in the sectional drawing), which rods are screw-threaded as at 6. The said rods pass through supporting-beams 7, which in turn are mounted upon a framework 8 having suitable supports 9. The threaded ends of the rods 5 are engaged by nuts 10, which have sprocket-wheels secured thereto and a sprocket-chain 11 passes from one of said wheels to the other, one of said nuts being provided with a hand-wheel 12, by which all may be operated to raise and lower the pot 4. This raising and lowering of the pot is similar to the tilting of the pot shown in my Patent No. 1,138,111, except that the pot 4 here is raised and lowered vertically instead of tilting about an axis, as shown in the patent referred to.

The siphon-tube 3 is provided with a suction connection or passage 13, which in turn communicates with a passage 14 in a suction connection 15, with which communicates a pipe 16 leading to any suitable apparatus for producing a vacuum. This suction passage serves to start the siphon and maintain the level of the surface of the glass within it at any desired point. The pot 4 is provided with a rib or dam 17 forming a pocket 18 around the outer leg of the siphon to hold a mass of molten glass around this outer leg of the siphon to facilitate starting. When the glass within the pocket 18 is at the same level as that of the glass in the tank 1, there is no flow of glass from the refining-chamber to the pot 4. As soon, however, as the pot 4 is lowered so that the level of the glass within it is below the level of that in the refining-chamber, the glass passes through the siphon into the pocket 18 and thence over the dam 17 into a second compartment 19 of the pot. This second compartment 19 is provided with an opening 20.

It is to be noted that there is no gravity flow of glass from the refining-chamber 1 into the pot 4, but the glass is transferred from the chamber to the pot only by the siphon action of the siphon-tube 3. To replace the glass flowing from the outer leg of the siphon, glass is elevated or transferred by suction or reduction of atmospheric pressure in the siphon 3 from the tank into the siphon. Whenever this siphon apparatus ceases to operate, there is no further discharge of glass from the tank through the siphon into the pot 4, and this is the normal condition in which the siphon remains during idle periods of the apparatus.

The advantages of this arrangement are many; incidentally, it enables a user to replace the spout-plug 21 in which the outlet here designated as 20 is formed without having to freeze the glass in the compartment 19; there being no outflow from the tank, it is practical to install the apparatus without stopping the operation of the tank.

Within the pot 4 is mounted a tube or plunger pipe 22, which conveniently may pass freely through an opening 23 in the top of the pot. This pipe is made of clay or other refractory material to obviate the deleterious action of the molten glass and of the temperature within the pot. The upper end of the pipe 22 may be enlarged slightly to form a shoulder 24 to receive a clamping means 25 for clamping a metal plate 26 over the top of the pipe or tube to which plate is threaded or otherwise secured a pipe 27, which, through a flexible connection 28, leads to a connection 29, which is in communication with a source of vacuum, the vacuum connection being controlled by a valve 30 having an operating lever 31. A second connection of the flexible pipe 28 is made at 32 with a pipe 33, which is in communication with a suitable source of pressure. This pressure connection is controlled by a second valve 34 having an operating lever 35.

Thus it will be seen that the tube 22 within the pot 4 may be placed in communication with a source of vacuum or a source of pressure, as desired, to accomplish purposes hereinafter specified.

The tube also is provided with means by which it may be raised or lowered within the pot to vary the distance of the lower end from the outlet 20 of the pot. To this end a forked lever 36 is provided, which is pivotally mounted on a movable fulcrum 37, said fulcrum point being supported on an arm 38 pivoted at 39 on a fixed bracket 40 secured to the framework 9. This fulcrum-arm 38 has an extension 41 provided with an arcuate slot 42 engaging a bolt and lock-nut 43 by which the fulcrum-arm 38, the fulcrum 37 and the lever 36 may be held adjusted in different fixed positions. The outer end of the lever 36 is pivotally connected at 44 with a rod 45, which rod is provided at its lower end with an eccentric strap 46 engaging an eccentric 47 mounted on a shaft 48. The shaft 48 may be rotated from any desired source of power. Thus it will be seen that upon rotation of the shaft 48, the tube 22 may be raised or lowered intermittently through the connections specified. The connection 44 is screw-threaded upon the vertical rod 45 and the position of the connection upon the rod is fixed by means of a lock nut $45^a$. This arrangement provides a means for adjusting the degree of vertical movement of the tube 22 in addition to the adjustment provided by the arm 38.

The purposes and mode of operation of this apparatus are to a large extent described in my Patent No. 1,315,668, Sept. 9, 1919, above referred to.

At temperatures necessary for working, molten glass is a stiff viscous fluid tenaciously adhering to any hot material. The flow starts by forming a half-globular drop at the orifice of the vessel; next, its adhesion to the edges of the orifice causes the drop to pull downward at the center, usually forming a drop, the upper end of which adheres to the orifice and the center pulls away to a small stream of thread and this attenuated condition remains constant. Glass resembles all other viscous liquids in this respect, but shows a very great contraction in area of stream.

If the head or level of the glass in the supply reservoir be increased or more pressure applied to the surface of the glass, this contraction below the orifice will be reduced. This is due to the fact that the adherence to the edge of the orifice is much greater than the tension of the glass particles to each other, and greater pressure forces more glass through the center of the drop without increasing to any great degree the flow at the edges or outer sides of the drop. Conversely, by decreasing pressure on the head or level of the glass, contraction of the stream is increased, and by varying the rate of flow, it is possible to so expand or contract the section of stream near the orifice as to make it resemble within narrow limits, a predetermined form. Also by cutting off the globule of glass close to the orifice the contracted section (or the tail part above the shears) will be drawn up into the half globular drop at the orifice by reason of the law that a drop of any fluid tends to assume a globular form up to the disrupting point, and corrects any deviation of form by drawing to it the distorted part by molecular attraction of its particles. This forms independent masses without supporting the stream on the shears or other cold members.

In the method employed in carrying out my invention, no forces operate upon the glass in its line of flow from the tank or other source of supply to the discharge opening, but instead forces act upon the glass at or beyond the orifice, and act in such a way as to accelerate the normal flow and not to stop it, so that by varying the amount of these forces, variation in the normal rate of flow is obtained.

This acceleration at or beyond the orifice is produced by the force of tension among the particles of the glass, and is applied after the glass leaves the orifice. This force of tension is very great in thick viscous liquids, such as glass at working temperature.

The force of varying pressure is applied to the drop after it is formed and is used to correct the shape of the globule independent of the force of gravity, which is the sole force which ordinarily acts to shape the drop at or after it has passed the opening.

Figs. 3 to 7 illustrate in detail the general operation of the apparatus, in so far as it concerns the flow of the glass from the pot in the forming of the gather or gob, and also show the control of the formation of the gather or gob.

Assuming that the pot 4 contains glass at the proper level for the operation of the apparatus, as shown, for example, in Fig. 1, and a gather or gob is about to be formed, the tube or pipe 22 is in the position indicated in Figs. 1, 3, 5 and 6, and the shears, which are indicated diagrammatically at 49, are open. With the parts in this position, the tube 22 forms with the walls of the pot-opening 20 a discharge orifice, which is clearly shown at 50. At this point, I desire to draw attention to the clear distinction which I make between the opening 20 of the pot and what I here term as my "discharge orifice", or that passage for the molten glass where the glass after passing the orifice 50 is relieved of the pressures due to head or gravity influences of the mass of glass within the pot. This distinction must be clearly borne in mind in reading the following description of the operation of the apparatus, the term "outlet" on the one hand, referring to the opening 20 in the bottom of the pot; and the term "orifice", referring to the passage 50 between the lower end of the tube 22 and the walls of the cavity or well above the pot-opening 20.

Also, I make a distinction between this orifice 50 and the opening or passage 22′ in the tube 22, which opening 22′, like the pot-opening 20, does not affect the glass until after it has passed the orifice 50, but merely directs the course of the glass after it has left the passage 50.

In the ordinary operation of the device, the tube 22 may be in the position shown, for example, in Figs. 1, 3, 5, and 6 and even slightly above the bottom of the pot; or, on the other hand, this tube may, if desired, project down to a point beyond the lower end of the pot-opening, as shown in Figs. 9 to 13, inclusive. In either case, the mode of operation of the device is substantially the same. When vacuum or suction is applied through the tube 22, the glass is drawn up inside the tube, as shown at 52 in Figs. 1, 3, and 13. It is to be understood that the relative diameter of the opening 20 and of the pipe 22 are such that the sucking-up action into the pipe 22 cannot and does not stop normal flow of the glass down through the orifice 50 between the walls of said opening 20 and the walls of the pipe 22. In other words, the parts are so proportioned that no matter how rapidly glass may be sucked up into the pipe 22, this has no tendency to check or retard the flow of the glass down through the orifice 50. On the contrary, the only effect which sucking-up of the glass into the pipe 22 may have is that flow of the glass out through the orifice 50, as distinguished from the pot-opening 20, may be thereby accelerated, but it is never checked. It will be obvious that this condition of acceleration of the flow of glass down through the orifice caused by the suction in the pipe 22 will take place both when the pipe is slightly elevated above the opening 20, or even though the pipe is depressed below the opening 20. With the parts properly proportioned, it is clear that the sucking-up action of the pipe 22 may take place in such way as simply to cause the acceleration of flow between the edge of the pipe and the edge of the pot-opening.

In using this apparatus, the glass flowing down through the orifice first assumes the more or less globular shape, shown at 53, Fig. 9. At the same time that this initial flow takes place, a certain amount of glass may be drawn up into the tube 22, as shown at 54, Fig. 9. Then, as the flow continues out through the orifice 50, and when the globule 53 elongates, as at 55, Fig. 10, and thereby tends to become attenuated or thin, the glass in the tube 22 may be forced out as shown at 56, Fig. 10, to fill in the center of the globule and cause the globule to assume substantially the form shown at 55, Fig. 10. Continued expulsion of the glass from the pipe 22, as illustrated at 57 in Figs. 5 and 11, causes the globule to maintain substantially a uniform diameter, as shown at such points 57 in Figs. 5 and 11, so that we then have a mass of glass ready for discharge into a mold or the like, which is of substantially uniform diameter and of practically predetermined shape and mass.

When, now, it is desired to cut off this freely-hanging globule to deposit the same in the mold, the sucking action into the tube 22 may be resumed, as shown at 58 in Fig. 12, and it may be made sufficiently rapid to cause a decided contraction in the globule at the point 59, Fig. 12. It will be understood, however, that the flow of the glass down through the orifice 50 has not thus been checked, but after the glass had passed into and partially out of the orifice 50, it is drawn up into the tube 22, instead of being supplied to the completed globule 60. The globule is then cut off at the point 59 in the ordinary manner, as shown at 61, Fig. 6, by means of the shears 49. At this stage of the proceedings, one of the principal advantages of this invention comes into play which is the taking care of the chilled part of the globude, which is cut off by the cutting shears. This chilled part is indicated as located at the point 62, Figs. 3, 6, and 13.

It is obvious that the sucking action of the tube 22 draws upon the glass after it is flowed down past the lower end of said tube 22, and any of the glass which lies below the lower end of this tube tends to be sucked up into the tube under the action of the vacuum. This action, therefore, is illustrated in Figs. 3, 6 and 13, in which it is seen that the lower end of the globule, which follows the one cut off, tends to be drawn up into the tube 22 and, therefore, the chilled portion 62 of the following globule, which was that part which contacted with the shears when the first globule was cut off, is drawn up into the tube 22; but, as the time, the glass continues to flow from the orifice of the vessel down and around the lower end of the tube 22 and, consequently, this fresh-flowing hot glass completely surrounds and incorporates the chilled part 62 into the center of its mass, or else so stretches and kneads this chilled part as to distribute or stretch it over that part of the surface of the drop removed from the point of the drop. By this stretching action, this chilled part is re-heated by the body of the glass. Thus when the second globule is formed, and the glass is again expelled from the tube 22, this chilled portion will likewise be expelled into the center of the mass of the forming globule or stretch over it, and will become assimilated and incorporated in it in such a way that it will not detrimentally affect the homogeneity of the glass in said globule.

In extremely large gathers or where the glass becomes quite stiff, a small flame can be directed against the suspended gather 57 so that the point of the gather can be slightly reheated and thus re-enforce the other agencies for the removal of the chilled spot. This arrangement is shown in Fig. 15 where the small flame 80 is projected against the gather by means of a burner 81 controlled by a valve 82.

It will be seen, therefore, that by this method practiced by the apparatus thus far described, while the flow of the glass out through the orifice 50 of the pot may be accelerated beyond the normal rate at will, it cannot be checked to a point below the normal rate of flow.

By increasing the speed of the glass, either when rising or falling in the tube 22, a method is provided for increasing the normal rate of flow and for thus providing a regulating means for equalizing variations due to changes of temperature in the glass, both of which would affect the normal flow from the reservoir out through the orifice.

It will be understood that the varying of the suction or pressure within the pipe or tube 22 is effected by the properly timed operations of the valves 30 and 34 of the pipes 29 and 33, respectively. For this purpose the operating lever 31 of the valve 30 is connected to a rod 68, which has at its lower end an anti-friction roller 69 bearing on a cam 70. The rod 68 passes through a guide-sleeve 71, and has surrounding it below said guide-sleeve a spring 72, which holds the anti-friction roller 69 in contact with the cam 70. The operating-lever 35 of the valve 34 is connected by a rod 73 in a similar manner with a second cam 74, and is held in contact therewith in the same way, the cams 70 and 74 being fixed on the shaft 48. As this shaft rotates, therefore, the communication with the source of vacuum and the source of pressure will be properly timed for the operations intended.

It is to be understood also that the shears 49 are operatively connected with actuating mechanism so that said shears will be operated in synchronism with the forming of the drop or gob, and will cut off the gobs in proper succession and at proper times determined by the forming of the gob, which is, in this case, under the control of the operator; that is to say, gobs of greater or less length may be formed, and in other respects the character of the gob may be varied to suit the particular purpose for which it is to be used.

Now referring to the raising and lowering of the second tube or pipe 22, its raised position is indicated in Fig. 4 of the drawings. This raising and lowering is controlled by the lever 36, and its operating mechanism heretofore described.

It is to be understood that this raising and lowering of the tube is not intended for the purposes of disposing of the chilled spot on the gob, but it is to be employed in the first-place for the delaying of the formation of the gob, which is accomplished by raising the tube; and, second, for adding to the acceleration of the glass to form in some instances a larger gob through the same diameter of pot-opening; that is to say, in lowering the tube. In any event, however, it is to be understood that the sucking-up of the chilled part of the gob is first performed by the sucking action of this tube when in its lowermost position as that is the effective position for this action. In order that the pipe may always assume its most effective lower position, but at the same time, in order that the travel of the tube may be increased or diminished as desired, I provide the movable fulcrum 37 for the lever 36,—it being understood that in any adjusted position of this fulcrum, the tube will always seek approximately the same lowermost position with respect to the bottom of the pot, but its travel may be increased or diminished by such adjustment. Therefore, in employing this up-and-down movement of the tube as an adjunct to its normal action in accelerating the feed of the glass, it is first held at its lowered position after a gob has been cut off to suck up the chilled portion of the following gob. This sucking action also retards the formation of the following gob, which retardation is increased by then raising the tube. It will be noted at this point that the raising of the tube has increased what was formerly the orifice, and allowed for a greater flow of glass through the opening in the bottom of the pot. When the retardation period has extended for the desired time, the tube is again lowered and in so lowering, it accelerates the flow of the glass out through the opening in the bottom of the pot. When the tube is in its lower position, expulsion of the glass within the tube again fills the middle or body of the gob as heretofore described. This function of the tube 22 may be effectively employed in the forming of unusually large gobs for the fabrication of large articles, but it is to be understood that such up and down movement of the tube may be also employed effectively in the formation of small articles, the extent of travel of the tube being determined to some extent by the size of the article to be fabricated.

The travel of this tube has the further function that when the temperature of the glass in the vessel falls for any reason, and the glass becomes more viscous, the downward movement of the tube assists in the expulsion of the glass through the opening in the bottom of the pot, thus compensating for the cooling and consequent less workable condition of the glass by the vacuum and pressure action of the tube, and this effectiveness of the travel of the tube increases as the glass becomes colder. Conversely, as the glass slowly resumes a higher temperature, it follows that this plunger action of the tube becomes less effective in the more fluid glass, while at the same time, the suction and pressure action within the tube become the more effective on the more fluid or hotter glass; therefore, it will be seen that the travel of the tube and vacuum and pressure action within the tube practically stabilize each other in their ultimate effect.

In Fig. 14 is shown a modified form of the apparatus using the same principle, but in this case the auxiliary member or pipe takes the form of a laterally-extending passage 63, formed in an offset 64 of the reservoir or pot 4, and connected by a passage 65 with the source of vacuum. The lower end 66 of this auxiliary passage adjoins that of the orifice 50' from the tank 4. In this case, the auxiliary member or passage 63 takes the glass from and adds it again to the sides of the drop instead of feeding it directly to the center, but the chilled spot caused by the shearing-off of the previous drop is effectively incorparated into the mass of the following mass or globule, and is further removed from the lower end of the globule, which is the critical location when feeding the glass to a mold.

In Fig. 8 is shown another modified form of the apparatus using the same principle, but in this case the auxiliary member or pipe takes the form of a lateral horizontal passage 66, which is mounted just below the orifice $50^2$ in the bottom of the vessel 4. This passage 66 communicates with a suction-tube 67 connected with any suitable source of pressure-varying or suction means. In other respects, however, the operation of this modified apparatus is precisely the same as that heretofore described.

It is to be noted that the pot 4 here shown is in communication with the heat of the gases of the tank 1 through the passage or opening 2. Should it be necessary, however, to add additional heat to the interior of the pot, the same may be done by introducing a suitable source of flame or heat through an opening, such, for example, as the opening 75, Fig. 1.

The invention herein described is not limited as regards the broad terms of the claims to any particular construction or arrangement of mechanical devices, whereby the rate of flow or shape of the drop are affected by forces acting on the glass at or outside the orifice of the container, so as to increase such normal flow by pulling the glass through the discharge or outlet.

There are two distinct characteristics of my invention: First,—that the normal flow can be increased by force acting on the flow at or after it leaves the outlet; and, second,—that the section of the stream or shape of the globule can be varied without stopping or reversing the normal flow from the supply reservoir in the discharge opening, and without varying either the pressure upon or height of the surface level of the glass in any part of the supply reservoir. On the contrary, the entire action takes place on the glass after it has flowed slightly beyond the mass of glass in the container and the force applied to the flowing glass is expended entirely on the glass after it has passed beyond the influence of the glass in the container.

While I have herein described particular forms of apparatus by which my invention may be carried out, it is to be understood that the invention is not limited in any manner to such particular apparatus, but that the apparatus for and the method of carrying out the invention may be varied to any desired extent within the scope of the appended claims.

This application is a division of my copending application for Letters Patent, filed July 16, 1917, Serial No. 180,795.

What I claim is:

1. A container for a pool of molten glass, said container being provided with a bottom opening, a plunger, an actuator for the plunger mounted independently of the container, for giving the plunger a cycle of movement, and means for shifting the container to vary the clearance of the plunger in its cycle of movement as to container opening.

2. A container for a pool of molten glass, said container being provided with a bottom opening, a plunger co-acting with said opening, means for shifting the container opening toward and from said plunger, and an actuator providing a cycle of movement for the plunger as to the container.

3. A container for a pool of molten glass, said container being provided with a bottom opening, a plunger coacting with said opening, an adjustable mounting for the container, and an actuator providing a cycle of movement for the plunger as to the container.

4. A container for a pool of molten glass, said container being provided with a bottom opening, a plunger co-acting with said opening, an adjustable mounting for the container, a molten glass supply, means for adjusting the container as to said supply, and an actuator providing a cycle of movement for the plunger as to the container.

5. A container for a pool of molten glass, said container being provided with a bottom opening, a plunger co-acting with said opening, an adjustable mounting for the container, a molten glass supply, a spout from said supply to said container, means for adjusting the container as to said supply, and an actuator providing a cycle of movement for the plunger as to the container.

6. A container for a pool of molten glass, said container being provided with a bottom opening and a side opening, a plunger co-acting with said bottom opening, a spout extending into said side opening, means for adjusting the container as to said spout, and an actuator providing a cycle of movement for the plunger as to the container.

7. A glass supply, a spout therefrom, guide means adjacent said spout, a container of boot type having a discharge opening coacting with said guide means, means for shifting the container as to said guide means, and a plunger adjacent said opening having a cycle of movement as to the container and spout.

8. The method of controlling the flow through a submerged orifice, which consists in accumulating a charge of molten material from a batch located above the orifice by occasioning a flow through the batch away from the orifice, in moving the accumulated charge bodily toward the flow orifice and in discharging it through the flow orifice.

9. The method of controlling the flow through a submerged flow orifice, which consists in accumulating a quota of molten material from a batch of the same while bodily moving the accumulating quota through the batch and away from the orifice, and then in bodily moving the accumulated quota toward the orifice and discharging material therefrom through the orifice.

10. The method of controlling the flow of molten glass through a submerged flow orifice, which consists in accumulating a determined quota of molten glass from a batch located above the orifice while moving the accumulating quota bodily away from the orifice, then in moving the accumulated quota bodily toward the orifice and in augmenting the flow through the orifice by discharging glass from the quota therethrough.

11. The method of controlling the flow of molten glass through a submerged flow orifice, which consists in accumulating a quota of molten glass from a batch located above the flow orifice while moving the accumulating quota bodily away from the orifice, then in moving the accumulated quota bodily toward the orifice and simultaneously ejecting glass from the batch through the orifice, augmenting the flow through the orifice by discharging glass from the quota therethrough.

12. The method of controlling the flow of molten glass, through a submerged flow orifice which consists in accumulating a determined quota of glass above the flow orifice from a batch located above the orifice, moving an accumulating element through the batch toward the flow orifice while maintaining the accumulated quota in open communication with the batch and in augmenting the flow through the orifice by discharging glass from the quota therethrough.

13. The method of controlling the flow of molten glass from a mass of molten glass located above a flow orifice submerged by said mass, which consists in accumulating a quota of glass from said mass and above said flow orifice, and moving the accumulated quota toward said orifice while substantially confining the effect of the moving force to said quota, and then in discharging glass from said quota through said orifice under the influence of said moving force.

14. The method of delivering mold charges of molten glass from a receptacle containing a body of molten glass and provided with a flow orifice which consists in accumulating a quota of glass within the body and above the orifice, moving the accumulated quota through the body toward the flow orifice and then in discharging glass from the quota through the orifice.

15. The method of controlling the flow through a submerged orifice, which consists in accumulating a charge of molten material of determined size by occasioning a flow within a batch of molten material away from the orifice, in moving the accumulated quota bodily through the batch and in discharging it through the orifice.

16. The method of controlling the flow of molten glass through a submerged flow orifice, which consists in accumulating a quota of molten glass from a batch located above the orifice, then in bodily moving the accumulated quota through the batch and simultaneously mechanically ejecting glass from the batch through the orifice, and in augmenting the flow through the orifice by discharging glass from said quota therethrough.

17. The method of controlling the flow of molten glass through a flow orifice which consists in accumulating a charge of molten glass in an accumulating element above the flow orifice, moving said accumulated charge toward the flow orifice and discharging glass therefrom through said orifice.

18. In a glass feeding apparatus, the combination with a tank or other melting furnace, of a vertically adjustable and normally stationary container having an aperture for discharging molten glass, a siphon member connecting said tank and said receptacle for maintaining the glass in the said tank and in said receptacle at approximately the same level, and means effective adjacent the aperture for controlling the discharge of glass through the aperture.

In testimony whereof I, the said GEORGE E. HOWARD, have hereunto set my hand.

GEORGE E. HOWARD.